United States Patent [19] [11] 3,903,006
Elliott et al. [45] Sept. 2, 1975

[54] SYNTHETIC ESTERS

[75] Inventors: John Scotchford Elliott; Monty Frederick Crook; Gerald John Joseph Jayne, all of London, England

[73] Assignee: Castrol Limited, London, England

[22] Filed: May 8, 1972

[21] Appl. No.: 251,524

Related U.S. Application Data

[62] Division of Ser. No. 98,963, Dec. 16, 1970, abandoned.

[52] U.S. Cl. .................. 252/79; 252/73; 260/615 A
[51] Int. Cl.² ...................... C09K 3/00; C10M 3/20
[58] Field of Search ............... 252/73, 615 A, 79

[56] References Cited
UNITED STATES PATENTS
2,867,667  1/1959  Dermer et al. ............... 260/615 A
3,354,100  11/1967  Kuryla ....................... 260/615 A X Primary Examiner—Ralph S. Kendall
Assistant Examiner—Harris A. Pitlick
Attorney, Agent, or Firm—Bacon & Thomas

[57] ABSTRACT

A hydraulic fluid consists of, or comprises a synthetic orthoester, or a mixture of synthetic orthoesters, having the general formula represented by A or B:

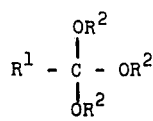 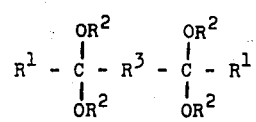

A    B wherein $R^1$, $R^2$ and $R^3$ are specified groups. Also described are methods of making compositions which comprise a major proportion of the synthetic orthoesters and novel synthetic orthoesters of the formula:

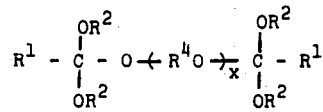

wherein $R^4$ and $x$ are specified groups.

13 Claims, No Drawings

SYNTHETIC ESTERS

This is a division of application Ser. No. 98,963 filed Dec. 16, 1970 and now abandoned.

The present invention relates to synthetic orthoesters suitable for use in hydraulic fluids, some of which orthoesters are novel compounds.

According to the present invention there is provided a hydraulic fluid consisting of, or comprising, a synthetic orthoester having the general formula represented by A or B:

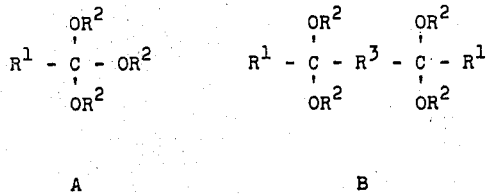

wherein
- $R^1$ is a hydrogen atom, an alkyl radical containing from 1 to 5 carbon atoms, or the same as $OR^2$;
- each $R^2$ is the same or different and each is an alkyl radical containing from 1 to 4 carbon atoms, an oxyalkylene glycol mono ether radical, or a polyoxyalkylene glycol mono ether radical containing from 2 to 20 alkylene oxy units, provided that at least one $R^2$ is an oxyalkylene glycol mono ether radical or a polyoxyalkylene glycol mono ether radical;
- and $R^3$ is an alkylene radical containing from 1 to 12 carbon atoms, provided that $R^1$ is then the same as $OR^2$ or $R^3$ is the group $-(O-R^4O)_x-$, wherein each $R^4$ is the same or different and each is an alkylene radical containing from 2 to 8 carbon atoms and $x$ is an integer from 1 to 6, or a mixture of two or more such synthetic orthoesters.

In another aspect of the present invention the hydraulic fluid comprises from 1 to 99 percent by weight, based on the weight of the hydraulic fluid, of the foregoing orthoesters.

In a further aspect of the present invention there is provided a hydraulic system containing the hydraulic fluids of the present invention. In yet another aspect of the present invention there is provided a method of transmitting power in a hydraulic system, which method comprises introducing into the system a hydraulic fluid in accordance with the present invention and transmitting power by applying pressure thereto.

The orthoesters employed in the hydraulic fluids are particularly useful when employed in minor amounts, e.g. 1 to 50 percent by weight, as water scavengers. In a preferred form of the invention the orthoesters are used in amounts of 1 to 30 percent, more preferably 5 to 20 percent by weight.

In those orthoesters which are particularly useful as hydraulic fluids, or components thereof, preferably
- $R^1$ is a hydrogen atom, an alkyl radical containing 1 or 2 carbon atoms, or is the same as $OR^2$;
- each $R^2$ is the same or different and each is an alkyl radical containing 1 or 2 carbon atoms, or $R^2$ is the radical $-(R^6O)_n-R^5$, wherein each $R^6$ is the same or different and each is an alkylene radical containing from 2 to 4 carbon atoms, each $R^5$ is the same or different and each is an alkyl radical containing from 1 to 4 carbon atoms, more preferably 1 or 2 carbon atoms, and n is an integer from 1 to 4, provided that at least one $R^2$, more preferably 2 or 3 (in the case of formula A) or at least 3 (in the case of formula B) is the radical $-(R^6O)_n-R^5$; and
- $R^3$ is an alkylene radical containing from 1 to 6 carbon atoms, provided that $R^1$ is then the same as $OR^2$, or $R^3$ is the group $-O(-R^4O)_x-$
wherein each $R^4$ is the same or different and each is an alkylene radical containing from 2–6 carbon atoms and $x$ is an integer from 1 to 4.

Particularly preferred compounds suitable for use in hydraulic fluids are the orthoformates, orthoacetates, and orthopropionates of the monoethyl or monomethyl ethers of ethylene glycol, diethylene glycol or triethylene glycol or of propylene glycol, dipropylene glycol or tripropylene glycol or the orthoformate, orthoacetate and orthopropionate esters derived from mixtures of the above-mentioned glycol ethers. Alternatively, the corresponding orthocarbonates may be employed, if desired.

The hydraulic fluids of the present invention may contain, for example, in major amounts, polyoxyalkylene glycol ether esters of dicarboxylic acids such as those described in U.K. Pat. No. 1,083,324 or alkyl esters of polyoxyalkylene glycols or glycol ethers having the formula:

$$R'O - (R''O)_y - OCR'''$$

wherein $R'$ is an alkyl group containing from 1 to 4, preferably 1 or 2, carbon atoms or is the group $-CO-R'''$, $y$ is an integer of from 1 to 4, preferably 2 or 3, each $R''$ is the same or different and is an alkylene group containing from 1 to 4, preferably 2 or 3, carbon atoms and $R'''$ is an alkyl group containing from 1 to 4, preferably 2 or 3 carbon atoms.

Alternatively the hydraulic fluids of the present invention may contain major amounts of polyoxyalkylene glycols or ethers thereof. Examples of such glycols and ethers are ethylene glycol, diethylene glycol, triethylene glycol, the corresponding propylene glycols, the monomethyl and monoethyl ethers of the foregoing glycols, mixed ethylene/propylene glycols and ethers thereof and commercially available mixtures of glycols and/or glycol monoethers such as those marketed under the trade names PEG 200 and "Ucons." The glycols and glycol ethers may also be blended with the polyoxyalkylene glycol ether esters of dicarboxylic acids hereinbefore described. However, in order to preserve the desirable low hygroscopicity of the esters it is preferred that not more than 10 percent by weight of the polyoxyalkylene glycols and ethers are blended therewith.

Other components which may be included in the hydraulic fluids of the present invention include the cyclic alkylene carbonates, and carbonates derived from the monomethyl and monoethyl esters of ethylene glycol, diethylene glycol and triethylene glycol.

The hydraulic fluid compositions of the present invention preferably have a viscosity of less than 5,000 cSt, more preferably less than 2,000 cSt, at −40°C, and a boiling point of at least 260°C. In addition the hydraulic fluids are preferably blended so as to satisfy the rubber swell requirements of the S.A.E. J1703b Specification.

It will be understood that the hydraulic fluid compositions of the present invention may contain small amounts of the usual and well-known hydraulic fluid additives, particularly but not exclusively lubricity agents and corrosion inhibitors.

As hereinbefore described, certain of the orthoesters used in the hydraulic fluids of the present invention are novel compounds. Accordingly the present invention also provides as new compounds orthoesters or mixtures of orthoesters having the general formula:

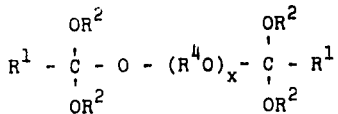

wherein $R^1$, $R^2$, $R^4$ and $x$ are as hereinbefore defined.

The compounds which form the essential components of the hydraulic fluids of the present invention are orthoesters and several methods of preparing orthoesters are known. For example, reaction of hydrogen cyanide and gaseous hydrogen chloride with absolute alcohol produces an intermediate imido ether hydrochloride which reacts with further alcohol in the presence of a base to produce an orthoester and ammonium chloride. The reaction is normally carried out in a solvent, such as chlorobenzene, diethyl ether, chloroform, o- dichlorobenzene or petroleum ether, from which the ammonium chloride precipitates. In a variation of this reaction (Pinner synthesis) the alcohol and gaseous hydrogen chloride are reacted with a nitrile or a dinitrile compound, for example adipo-1,6-dinitrile may be reacted, e.g. by the method of U.K. Pat. No. 1,128,963, to yield an orthoadipate. In a second preparative method a halo compound, such as vinylidene chloride, is reacted with a sodium alcoholate, such as that derived from diethylene glycol monomethyl ether, in an excess of the glycol ether, in a variation of the well known Williamson ether synthesis, for example by the method of U.S. Pat. No. 3,419,580.

Accordingly the present invention further provides a method of preparing a composition comprising a major amount of a synthetic orthoester, or a mixture of synthetic orthoesters, having the general formula represented by A or B:

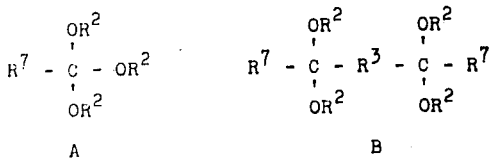

wherein $R^7$ is an alkyl radical containing from 1 to 5 carbon atoms and $R^2$ and $R^3$ are as defined in claim 1, said composition being suitable for use in a hydraulic fluid, which method comprises reacting a sodium alcoholate of a monoether of an oxyalkylene or polyoxyalkylene glycol, the alcoholate having the general formula $R^2ONa$, with a halo compound having the general formula $R^8 — C = CX_2$, wherein $R^8$ is a hydrogen atom or an alkyl group containing from 1 to 4 carbon atoms and each X is the same or different and each is a halogen atom.

Yet another possible method of preparation involves reaction of trialkyl orthoesters with alkylene oxides to yield tris glycol ether orthoesters or mixed glycol ether/alkyl orthoesters (in the manner of U.S. Pat. No. 2,867,667).

A convenient method of preparing the orthoesters employed in the hydraulic fluids of the present invention is by transesterification with a lower alkyl, e.g. methyl or ethyl, orthoester in the presence of a catalyst. Examples of useful lower alkyl orthoesters are trimethyl and triethyl orthoformate, orthoacetate and orthopropionate and Friedel Crafts catalysts, particularly aluminium chloride, are exemplary of utilisable catalysts. Other catalysts which may be used are ion exchange resins, hydrogen chloride gas, lower (e.g. $C_{1-4}$) aliphatic carboxylic acids and activated earth catalysts.

Accordingly the present invention further provides a method of preparing a composition comprising a major amount of a synthetic orthoester, or a mixture of synthetic orthoesters, having the general formula:

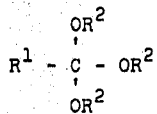

wherein $R^1$ and $R^2$ are as defined in above, said composition being suitable for use in a hydraulic fluid, which method comprises transesterifying a trialkyl orthoester of the formula:

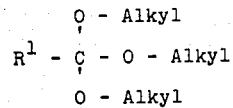

with a compound of the formula $R^2OH$ so as to produce a product containing as a major component a compound of the formula

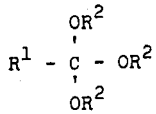

In the case of the novel orthoesters of the present invention, the transesterification is conveniently carried out in two stages. Firstly a trialkyl orthoester is transesterified with a monoether of an oxyalkylene or polyoxyalkylene glycol in the presence of a catalyst and in a molar ratio such that two of the alkyl groups in the initial orthoester are replaced by glycol monoether residues. The product from the first stage is then further transesterified with an alkylene, oxyalkylene or polyoxyalkylene glycol.

Accordingly the present invention also provides a method of preparing a composition comprising a major amount of a synthetic orthoester, or a mixture of synthetic orthoesters, having the general formula:

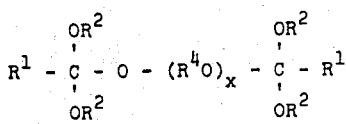

wherein $R^1$, $R^2$, $R^4$ and x are as hereinbefore defined, said composition being suitable for use in a hydraulic fluid, which method comprises transesterifying a trialkyl orthoester of the formula:

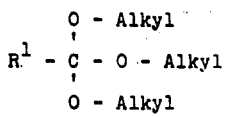

with a compound of the formula R²OH so as to produce a product containing as a major component a compound of the formula:

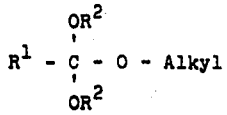

and thereafter transesterifying the product with a diol of the formula $H - O - (R^4O)_x - H$. Preferably both transesterifications are carried out in the presence of an aluminium chloride catalyst and with substantially stoichiometric quantities of reactants. In the case of the second transesterification it is preferred to carry out the reaction in the presence of further quantities of the compound R²OH.

There now follows by way of example a description of preparations of the orthoesters and hydraulic fluids containing the orthoesters in accordance with the present invention.

EXAMPLE 1

148 g. (1.0 mole) of triethyl orthoformate, 592 g. (3 mole) triethylene glycol monoethyl ether which had been previously dried by molecular sieves, and 1 g. of aluminium trichloride were stirred under reflux in a nitrogen atmosphere. 114 g. (Theory 138.6 g.) ethanol was distilled out during the reaction through a 9 inch column packed with Fenske helices. The product was dissolved in toluene, washed with 20 ml. of water, filtered and dried over magnesium sulphate and the solvent distilled off under vacuum. From infra-red analysis it was inferred that the product was tris (ethyl triglycol) orthoformate. This had a viscosity at −40°C of 1,521 cSt.

EXAMPLES 2 to 16

Further esters were prepared in similar manner to Example 1, the relevant details of the preparations being set out in Table 1.

EXAMPLE 17

296 g. (2.0 mole) of triethyl orthoformate and 480 g. (4.0 mole) diethylene glycol monomethyl ether were reacted in the presence of 1 g. of aluminium trichloride for 2½ hours at a temperature at 148°C, during which period 142.5 g. ethanol (theory 184 g.) were distilled off. A further 1 g. of aluminium trichloride was then added together with 48 g. diethylene glycol monomethyl ether and 106 g. (1.0 mole) diethylene glycol.

The resultant mixture was further reacted for 5 hours at a temperature of 150°–185°C, during which period 90 g. ethanol (theory 92 g.) were distilled off. Further heating to 200°C gave no more distillate.

The distillation residue was cooled and then stirred for 2 hours with 30 ml. of water, filtered, dried over magnesium sulphate and low boiling components distilled off at 190°C under vacuum.

The residue was a viscous liquid (yield 266 g. 44 percent), infra-red analysis of which was consistent with its being predominantly diethylene glycol bis di(diethylene glycol monomethyl ether) orthoformate together with small amounts of unreacted glycol and/or glyol ether.

EXAMPLE 18

Hexamethylene glycol bis di(diethylene glycol monomethyl ether) orthoformate was prepared by a similar process to Example 17. The first transesterification was the same as in Example 17 except in that the starting materials were reacted for 8 hours at 125°–130°C to give 193 g. of ethanol distillate. To the product (distillation residue) of the first transesterification were added 1 g. aluminium trichloride, 48 g. diethylene glycol monomethyl ether and 118 g. (1.0 mole) hexamethylene glycol. Evolution of ethanol (63.2 g.) occurred slowly over a period of 3 hours. 150 ml. dimethyl formamide solvent and 1 g. aluminium trichloride were then added, but no further ethanol was evolved. On addition of 74 g. (0.5 mole) triethyl orthoformate and a further 1 g. aluminium trichloride and refluxing for 2 hours a further 29.7 g. ethanol were evolved.

The product was dissolved in toluene, stirred with water and filtered, low boiling components of the filtrate then being distilled off at 200°C under vacuum.

The final product (yield 514 g. 83 percent) was shown by infra-red analysis to contain small amounts of free glycol and/or glycol ether.

EXAMPLE 19

A mixture of the sodium alcoholate of diethylene glycol monomethyl ether in the glycol ether was prepared by reacting 3.3 moles (396 gm.) of diethylene glycol monomethyl ether with 2.0 moles (46 gm.) of metallic sodium under a nitrogen atmosphere and at a temperature of about 100°C. To this mixture was slowly added over three-fourths hour, with stirring, 1.0 mole (97 gm.) of vinylidene chloride under a nitrogen atmosphere during the course of which the temperature of the reaction mixture increased from 100°–140°C, and a precipitate of sodium chloride was formed. The reaction mixture was heated to 170°C for one-fourth hour and when cool was filtered to remove the salt. This was washed with diethyl ether and dried in a vacuum oven (yield 109.5 gm. theory 2 moles, 117 gm. of NaCl).

The ether washings and filtrate were combined, and the mixture was concentrated by removal of the ether, followed by stripping under reduced pressure to a base temperature of 200°C and stillhead temperature 80°C at 6mm. of mercury. The residue was an amber liquid (258 gm. 67 percent), IR analysis of which showed it to be predominantly tris (methyl diglycol) orthoacetate free of unreacted glycol ether. Analysis also showed very little normal ester (carbonyl peak >C=O at 1735 cm$^{-1}$) or C=CH$_2$ to be present.

TABLE 1

| Example No. | Glycol Ether | Wt. (g) | Moles | Starting Ester | Wt. (g) | Moles | Al Cl$_3$ Wt. (g) | Product | Wt. (g) | yield % |
|---|---|---|---|---|---|---|---|---|---|---|
| 2 | triethylene glycol monomethyl ether | 267 | 1.65 | triethyl orthopropionate | 88 | 0.5 | 0.5 | tris(methyl triglycol)orthopropionate | 206 | 77.6 |
| 3 | diethylene glycol monomethyl ether | 1980 | 16.5 | triethyl orthoformate | 740 | 5.0 | 5 | tris(methyl diglycol)orthoformate | 1509 | 81.5 |
| 4 | triethylene glycol monomethyl ether | 2070 | 12.62 | triethyl orthoformate | 565 | 3.82 | 4 | tris(methyl triglycol)orthoformate | 1264 | 65.5 |
| 5 | triethylene glycol monomethyl ether | 267 | 1.65 | triethyl orthoacetate | 81 | 0.5 | 0.5 | tris(methyl triglycol)orthoacetate | 142 | 68 |
| 6 | triethylene glycol monomethyl ether | 534 | 3.3 | triethyl orthopropionate | 176 | 1 | 2.0 | tris(methyl triglycol)orthopropionate | 260 | 49 |
| 7 | dipropylene glycol monomethyl ether | 444 | 3.0$^a$ | triethyl orthoformate | 148 | 1 | 1$^c$ | tris(dipropylene glycol monomethyl ether) orthoformate | 266 | 58.5 |
| 8 | ethylene glycol monomethyl ether | 456 | 6.0$^b$ | triethyl orthoformate | 296 | 2.0 | 2$^d$ | tris(methyl glycol)orthoformate | 380 | 83.5 |
| 9 | diethylene glycol monomethyl ether | 221 | 1.845 | triethyl orthovalerate | 99.6 | 0.615 | 0.2$^f$ | tris(methyl diglycol)orthovalerate | 196 | 74 |
| 10 | tetraethylene glycol monomethyl ether$^g$ | — | 1.5 | triethyl orthoformate | 74 | 0.5 | 1$^c$ | tris(methyl tetraglycol)orthoformate | 183 | 57.5 |
| 11 | diethylene glycol monobutyl ether | 426 | 3.0$^a$ | triethyl orthoformate | 148 | 1 | 1$^c$ | tris(butyl diglycol)orthoformate | 269 | 54 |
| 12 | diethylene glycol monoethyl ether | 402 | 3.0 | triethyl orthoformate | 148 | 1.0 | 1$^j$ | tris(ethyl diglycol)orthoformate | 255 | 62 |
| 13 | diethylene glycol monomethyl ether | 1080 | 9.0$^h$ | triethyl orthoacetate | 486 | 3.0 | 1.5$^k$ | tris(methyl diglycol)orthoacetate | 991 | 86 |
| 14 | diethylene glycol monomethyl ether | 961 | 8.01$^h$ | triethyl orthopropionate | 469 | 2.67 | 1.3$^k$ | tris(methyl diglycol)orthopropionate | 728 | 68.5 |
| 15 | triethylene glycol monoethyl ether | 534 | 3.0$^h$ | triethyl orthoformate | 148 | 1.0 | 0.7$^k$ | tris(ethyl triglycol)orthoformate | 350 | 64 |
| 16 | 1-butoxy ethoxy-2-propanol | 1056 | 6.0$^l$ | triethyl orthoformate | 296 | 2.0 | 2.0$^l$ | tris(1-butoxyethoxy-2-propyl)orthoformate | 911 | 84.7 |

FOOTNOTES TO TABLE 1

$^a$Further glycol ether (0.3 mole) added after 5 hours.
$^b$Further glycol ether (0.6 mole) added after 6½ hours.
$^c$Further catalyst (1 g.) added after 5 hours.
$^d$Further catalyst (1 g.) added after 6½ hours and 9½ hours.
$^e$Further catalyst (1 g.) added after 3 hours and 6 hours.
$^f$Further catalyst (0.2 g.) added after 3¼ hours.
$^g$Starting ether contained 71% tetraethylene glycol monomethyl ether.
$^h$Further 10% glycol ether added after rapid evolution of ethanol ceased (4–6 hours).
$^j$Further quantity of catalyst added after rapid evolution of ethanol ceased.
$^k$Fulcat 14 (activated earth) catalyst used in place of Al Cl$_3$ and further quantity of catalyst added after rapid evolution of ethanol ceased.
$^l$Further glycol ether (0.6 mole) and catalyst (1 g.) added after 6 hours.

The suitability of the orthoesters for inclusion in hydraulic fluids was evaluated by determining the following properties:

a. The boiling point of the orthoesters.
b. The viscosity of the orthoesters at −40°F.
c. The effect of the inclusion of the orthoesters on the boiling point of a hydraulic fluid, both in the presence and in the absence of water.
d. The effect, i.e. swelling effect, of the orthoesters on a synthetic styrene-butadiene rubber and a natural rubber, both being of the kind commonly employed in hydraulic systems.

The effect of the orthoesters on boiling point was determined by comparison of the boiling points of the following fluids:

(i) Base fluid consisting of:

| | |
|---|---|
| Di(monomethyl ether of diethylene glycol)nylonate | 39% |
| Triethylene glycol dipropionate | 45% |
| Monomethyl ether of triethylene glycol | 5% |
| Monoethyl ether of triethylene glycol | 5% |
| Reoplex 641 (a commercially available lubricity additive) | 3% |
| Amine A | 3% |

Plus the following combination of additives:

| | |
|---|---|
| Di-n-butylamine | 0.05% |
| Benzotriazole | 0.05% |
| Triphenyl phosphite | 0.15% |
| Commercially available primary, saturated, straight chain aliphatic monoamine (95% primary, 5% secondary and tertiary amines; the alkyl chains being 97% C$_{12}$; 2% C$_{14}$ and 1% C$_{16}$) | 0.1% |
| Agerite Resin D (commercially available polymerised trimethyl dihydro quinoline resin) | 0.05% |

Amine A was a condensation product of propylene oxide (5.5 mole) with ammonia (1 mole) and Reoplex 641 was a complex ester of molecular weight about 712 derived from neopentyl glycol and a mixture of sebacic, azelaic and adipic acids in respective proportions, determined by analysis, of 53, 5 and 38 percent. The nylonate ester was an ester of a mixture of dicarboxylic acids as described in U.K. Pat. No. 1,083,324.

(ii) Base fluid + 10 percent orthoester.

(iii) Base fluid + 10 percent orthoester + 1 percent water.

The results of the evaluation of the orthoesters are shown in Table 2.

TABLE 2

| Orthoester | Viscosity at −40°F (cSt) | Orthoester | Boiling points (°F) Base fluid* + 10% Orthoester | Base fluid* + 10% Orthoester + 1% water | Boiling point drop (°F) | Rubber swell (natural rubber) in % volume increase 3 days | Rubber swell (synthetic rubber) in % volume increase 3 days |
|---|---|---|---|---|---|---|---|
| Product of Ex.2 | 2048 | 476 | — | — | — | 5.6 | 24.6 |
| Product of Ex.3 | 452 | 540 | — | — | — | 2.6 | 17.7 |
| Product of Ex.4 | 3027 | 552 | — | — | — | 0.32 | 11.7 |
| Product of Ex.5 | 3449 | 495 | — | — | — | 0.6 | 10.6 |
| Product of Ex.6 | 2756 | 478 | 556 | 453 | 103 | 2.6 | 16.0 |
| Product of Ex.7 | 589 | 496 | 514 | 428 | 86 | 43.4 | 59.4 |
| Product of Ex.8 | 89 | 484 | 439 | 383 | 56 | 17.2 | 50.0 |
| Product of Ex.9 | 205 | 453 | 550 | 432 | 118 | — | 65.5 |
| Product of Ex.10 | 10,023 | 594 | 583 | 457 | 126 | 2.3 | 2.7 |
| Product of Ex.11 | — | 468 | 540 | 441 | 99 | 43.6 | 74.3 |
| Product of Ex.12 | 561 | 541 | 545 | 433 | 112 | 12.1 | 34.4 |
| Product of Ex.13 | 404 | 469 | 538 | 428 | 110 | 6.4 | 23.4 |
| Product of Ex.14 | 536 | 437 | 527 | 419 | 108 | 14.3 | 40.1 |
| Product of Ex.15 | 1943 | 531 | 577 | 466 | 111 | 2.2 | 13.9 |
| Product of Ex.16 | 1098 | 513 | 547 | 421 | 126 | 69.6 | 56.4 |
| Product of Ex.17 | Too viscous for determination | 538 | 550 | 439 | 111 | 0.5 | 5.9 |
| Product of Ex.18 | 3247 | 527 | 536 | 451 | 85 | 1.1 | 12.2 |
| Product of Ex.19 | 806 | 475 | 543 | 453 | 90 | — | 23.1 |

*Base fluid has viscosity at −40°F of 1,700 cSt, a boiling point of 576°F and a boiling point of 396°F (drop 180°F) when containing 1% water.

From the results set out in Table 2 it can be seen that the addition of 1 percent water to the base fluid blend with 10 percent of the orthoesters produced a smaller drop in boiling point than in the case of adding 1 percent water to the base fluid in the absence of the orthoesters. This demonstrates the ability of the orthoesters to counteract, at least in part, the boiling point reduction caused when water is present in the hydraulic fluid, for example as a result of absorption of water vapour from the atmosphere by hygroscopic components of the fluid.

In further tests blends of the orthoacetate and orthopropionates of the monomethyl ethers of diethylene glycol were tested for compliance with the requirements of the SAE J1703b Specification and compared with a similar blend which did not contain an orthoester. The blends tested consisted of the following components:

| | |
|---|---|
| Ester base | 84% |
| Monoethyl ether of triethylene glycol) | 10% |
| Reoplex 641 | 3% |
| Amine A | 3% | plus the same combination of additives as employed in the base fluid hereinbefore described.

Three blends were tested in which the ester base was as follows:

| | Blend 1 | Blend 2 | Blend 3 |
|---|---|---|---|
| Di(monomethyl ether of diethylene glycol)nylonate | 45% | 50% | 48% |
| Triethylene glycol dipropionate | 39% | 24% | 26% |
| Tris(methyl diglycol)orthoacetate | — | 10% | — |
| Tris(methyl diglycol orthopropionate) | — | — | 10% |

The blends containing the orthoesters were found to comply in all respects with the requirements of the SAE J1703b Specification, as shown by the test results set out in the following Table 3.

TABLE 3

| TEST | REQUIREMENT | BLEND 1 | RESULTS BLEND 2 | BLEND 3 |
|---|---|---|---|---|
| BOILING POINT | 190°C min | 310° | 277° | 275° |
| FLASH POINT | 82°C min | 182° | 157° | 166° |
| VISCOSITY (cS): | | | | |
| at −40C | 1800 max | 1694 | 1721 | 1779 |
| 50C | 4.2 min | 5.4 | 6.35 | 6.14 |
| 100C | 1.5 min | 2.18 | 2.26 | 2.21 |
| pH VALUE | 7.0 – 11.5 | 8.6 | 9.05 | 8.75 |
| FLUID STABILITY: | | | | |
| high temperature stability | allowed change 3.0°C + 0.05° for every degree b.pt. exceeds 225°C. | −4 | −3 | +2 |
| chemical stability | allowed change 2°C max. | −1 | −1 | Nil |
| CORROSION: weight change (mg/cm²) | | | | |
| tinned iron | 0.2 max | +0.005 | +0.018 | +0.005 |
| steel | 0.2 max | +0.008 | +0.017 | −0.004 |
| aluminium | 0.1 max | +0.008 | +0.013 | −0.004 |
| cast iron | 0.2 max | +0.032 | +0.030 | +0.004 |
| brass | 0.4 max | −0.029 | Nil | −0.066 |
| copper | 0.4 max | −0.013 | +0.021 | −0.033 |
| pitting | Nil | Nil | Nil | Nil |
| gelation of test fluid | Nil | Nil | Nil | Nil |
| formation of crystalline deposit | Nil | Nil | Nil | Nil |

TABLE 3 —Continued

| TEST | REQUIREMENT | BLEND 1 | RESULTS BLEND 2 | BLEND 3 |
|---|---|---|---|---|
| sedimentation | 0.1% (by volume) max | 0.03 | 0.01 | 0.01 |
| pH value | 7.0 – 11.5 | 7.1 | 7.06 | 7.2 |
| SBR cup: | | | | |
| tackiness | Nil | Nil | Nil | Nil |
| blisters | Nil | Nil | Nil | Nil |
| carbon black | Nil | Nil | Nil | Nil |
| hardness decrease | 15° max | 5 | 4 | 4 |
| base diameter increase | 1.4 mm max | 0.76 | 0.61 | 0.93 |
| FLUIDITY AND APPEARANCE AT LOW TEMPERATURES: | | | | |
| −40C | | | | |
| hiding power chart | clearly discernable | clearly discernable | clearly discernable | clearly discernable |
| stratification | Nil | Nil | Nil | Nil |
| sedimentation | Nil | Nil | Nil | Nil |
| bubble inversion time | 10 secs max | 4 | 3 | 3 |
| −50C | | | | |
| hiding power chart | clearly discernable | clearly discernable | clearly discernable | clearly discernable |
| stratification | Nil | Nil | Nil | Nil |
| sedimentation | Nil | Nil | Nil | Nil |
| bubble inversion time | 35 secs max | 6 | 4 | 5 |
| EVAPORATION | | | | |
| weight loss | 80% max | 16.9 | 23 | 25 |
| gritty or abrasive residue | Nil | Nil | Nil | Nil |
| pour point of residue | −5°C max | <−20 | <−20 | <−20 |
| WATER TOLERANCE | | | | |
| at −40°C | | | | |
| hiding power chart | clearly discernable | clearly discernable | clearly discernable | clearly discernable |
| stratification | Nil | Nil | Nil | Nil |
| sedimentation | Nil | Nil | Nil | Nil |
| bubble inversion time | 10 secs max | 3 | 3 | 3 |
| at 60°C | | | | |
| stratification | Nil | Nil | Nil | Nil |
| sedimentation | 0.05% max | Nil | 0.04 | Nil |
| COMPATIBILITY | | | | |
| at −40°C | | | | |
| hiding power chart | clearly discernable | clearly discernable | clearly discernable | clearly discernable |
| stratification | Nil | Nil | Nil | Nil |
| sedimentation | Nil | Nil | Nil | Nil |
| at 60°C | | | | |
| stratification | Nil | Nil | Nil | Nil |
| sedimentation | 0.05% max | Nil | Nil | Nil |
| RESISTANCE TO OXIDATION | | | | |
| weight loss (mg/cm²) | | | | |
| aluminium | 0.05 max | −0.017 | −0.002 | +0.012 |
| cast iron | 0.3 max | −0.005 | +0.020 | +0.016 |
| pitting / roughening | Nil | Nil | Nil | Nil |
| EFFECT ON SBR CUP | | | | |
| 120 hrs at 70°C | | | | |
| hardness increase | Nil | Nil | Nil | Nil |
| hardness decrease | 10° max | 9 | 9 | 5 |
| base diameter increase | 0.15 – 1.4mm | 0.91 | 0.74 | 0.78 |
| tackiness | not excessive | Nil | Nil | Nil |
| blisters | Nil | Nil | Nil | Nil |
| carbon black | Nil | Nil | Nil | Nil |
| 70 hrs at 120°C | | | | |
| hardness increase | Nil | Nil | Nil | Nil |
| hardness decrease | 15° max | 13 | 6 | 9 |
| base diameter increase | 0.15 – 1.4mm | 1.16 | 1.01 | 1.33 |
| tackiness | not excessive | Nil | Nil | Nil |
| blisters | Nil | Nil | Nil | Nil |
| sloughing | Nil | Nil | Nil | Nil |

We claim:
1. In the operation of a fluid pressure operating device which uses hydraulic pressure transmission fluid, the improvement comprising using as said hydraulic pressure transmission fluid a composition including as the base fluid at least one orthoester of the formula:

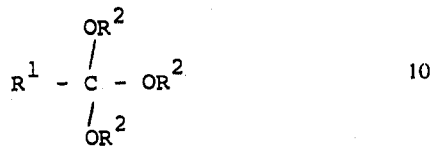

wherein $R^1$ is selected from the group consisting of hydrogen atoms and alkyl radicals containing from 1 to 5 carbon atoms; $R^2$ is selected from radicals having the formula $+R^6O+_n-R^5$ wherein $R^6$ is an alkylene radical containing from 2 to 4 carbon atoms, $R^5$ is an alkyl radical containing from 1 to 4 carbon atoms, and $n$ is an integer from 1 to 20.

2. In the operation of a fluid pressure operating device which uses hydraulic pressure transmission fluid, the improvement comprising using as said hydraulic pressure transmitting fluid a composition consisting essentially of:
   a. at least one synthetic orthoester having the general formula represented by A or B:

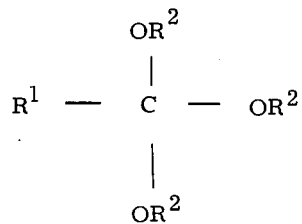 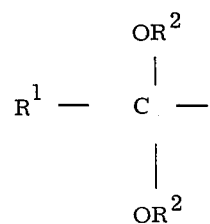 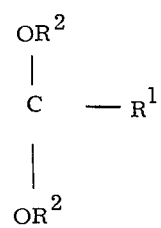

A  B wherein:
   i. $R^1$ is selected from the group consisting of hydrogen atoms, alkyl radicals containing from 1 to 5 carbon atoms and radicals having the formula $OR^2$;
   ii. each $R^2$ is the same or different and each is selected from the group consisting of alkyl radicals containing from 1 to 4 carbon atoms and radicals having the formula $+R^6O+_nR^5$ wherein each $R^6$ is the same or different and each is an alkylene radical containing from 2 to 4 carbon atoms, each $R^5$ is the same or different and each is an alkyl radical containing from 1 to 4 carbon atoms and $n$ is an integer of from 1 to 20;
   iii. $R^3$ is selected from the group consisting of alkylene radicals containing from 1 to 12 carbon atoms and radicals having the formula $-O+R^4O+_x$ in which each $R^4$ is the same or different and each is an alkylene radical containing from 2 to 8 carbon atoms and X is an integer of from 1 to 6; provided that $R^1$ is the same as $OR^2$ when $R^3$ is an alkylene radical containing from 1 to 12 carbon atoms; or,
   b. a mixture of at least one synthetic orthoester having said general formula represented by A or B together with at least one hydraulic fluid base stock selected from:
      i. polyoxyalkylene glycol ether esters of dicarboxylic acids;
      ii. alkyl esters having the general formula:

$$R'O +R''O+_y-OCR'''$$

wherein $R'$ is selected from the group consisting of alkyl radicals from 1 to 4 carbon atoms and radicals having the formula $-CO-R'''$, $y$ is an integer of from 1 to 4, each $R''$ is the same or different and is an alkylene group containing 1 to 4 carbon atoms and $R'''$ is an alkyl group containing from 1 to 4 carbon atoms;
      iii. polyoxyalkylene glycols; and
      iv. polyoxyalkylene glycol ethers; the synthetic orthoester or orthoesters being present in the mixture in an amount of at least about 1 percent by weight provided that at least one $R^2$, in the case of formula A, or at least three $R^2$ in the case of formula B be the radical $+R^6O+_nR^5$ as defined above.

3. The improvement defined in claim 2 wherein said synthetic orthoester has the general formula represented by A or B in which:
$R^1$ is selected from the group consisting of hydrogen atoms, alkyl radicals containing from 1 to 2 carbon atoms and radicals having the formula $OR^2$; each $R^2$ is the same or different and each is selected from the group consisting of alkyl radicals containing from 1 to 2 carbon atoms and radicals having the formula $+R^6O+_n R^5$ wherein each $R^6$ is the same or different and each is an alkylene radical containing from 2 to 4 carbon atoms, each $R^5$ is the same or different and each is an alkyl radical containing from 1 to 4 carbon atoms, and $n$ is an integer from 1 to 4; and $R^3$ is selected from the group consisting of alkylene radicals containing from 1 to 6 carbon atoms, and radicals having the formula $-O+R^4O+_x$ wherein each $R^4$ is the same or different and each is an alkylene radical containing from 2 to 6 carbon atoms and $x$ is an integer from 1 to 4.

4. The improvement defined in claim 3 wherein said synthetic orthoester has the general formula represented by A.

5. The improvement defined in claim 3 wherein said synthetic orthoester has the general formula represented by B.

6. The improvement defined in claim 3 wherein said synthetic orthoester has the general formula represented by A or B and in which each $R^5$ in the $+R^6O+_nR^5$ is the same or different and each is an alkyl radical containing from 1 to 2 carbon atoms.

7. The improvement defined in claim 6 wherein said synthetic orthoester has the general formula represented by A and at least 2 of the R² groups have the formula $+R^6O+_nR^5$.

8. The improvement defined in claim 2 wherein the hydraulic pressure transmitting fluid consists essentially of the mixture (b) and wherein the synthetic orthoester or orthoesters are present in such mixture in an amount of from 1 to 30 percent by weight.

9. A hydraulic pressure transmitting fluid consisting essentially of a mixture of:

a. at least one synthetic orthoester having the general formula represented by A or B:

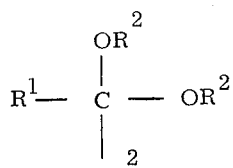

A

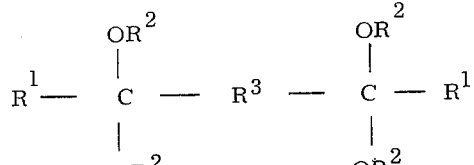

B wherein:
i. R¹ is selected from the group consisting of hydrogen atoms, alkyl radicals containing from 1 to 5 carbon atoms and radicals having the formula OR²;
ii. each R² is the same or different and each is selected from the group consisting of alkyl radicals containing from 1 to 4 carbon atoms and radicals

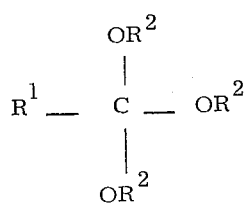

A having the formula $+R^6O+_nR^5$ wherein each R⁶ is the same or different and each is an alkylene radical containing from 2 to 4 carbon atoms, each R⁵ is the same or different and each is an alkyl radical containing from 1 to 4 carbon atoms and $n$ is an integer of from 1 to 20; and
iii. R³ is selected from the group consisting of alkylene radicals containing from 1 to 12 carbon atoms and radicals having the formula $-O+R^4O+_x$ in which each R⁴ is the same or different and each is an alkylene radical containing from 2 to 8 carbon atoms and X is an integer of from 1 to 6; provided that R¹ is the same as OR² when R³ is an alkylene radical containing from 1 to 12 carbon atoms; and
b. at least one hydraulic fluid base stock selected from:
i. polyoxyalkylene glycol ether esters of dicarboxylic acids;
ii. alkyl esters having the general formula:

$$R^IO+R^{II}O+_yOCR^{III}$$

wherein R¹ is selected from the group consisting of alkyl radicals from 1 to 4 carbon atoms and radicals having the formula $-CO-R^{III}$, $y$ is an integer of from 1 to 4, each R'' is the same or different and is an alkylene group containing 1 to 4 carbon atoms and R''' is an alkyl group containing from 1 to 4 carbon atoms;
iii. polyoxyalkylene glycols; and
iv. polyoxylakylene glycol ethers; the synthetic orthoester or orthoesters being present in the mixture in an amount of at least about 1 percent by weight provided that at least one R², in the case of formula A, or at least three R² in the case of formula B be the radical $+R^6O+_nR^5$ as defined above.

10. The hydraulic pressure transmitting fluid of claim 9 wherein the synthetic orthoester or orthoesters are present in amount of from 1 to 30 percent by weight.

11. The hydraulic pressure transmitting fluid of claim 9 wherein a minor amount of a corrosion inhibiting hydraulic fluid additive is present in the mixture.

12. A hydraulic pressure transmitting fluid consisting essentially of at least one synthetic orthoester having the general formula of at least one synthetic orthoester having the general formula represented by A or B:

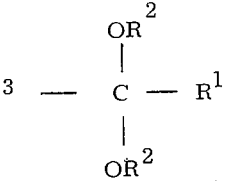

A

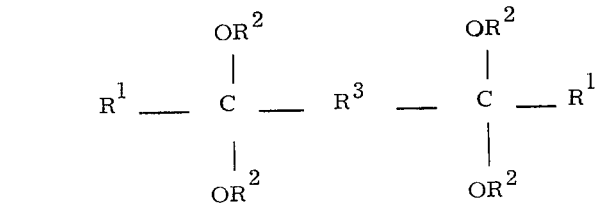

B wherein:
i. R¹ is selected from the group consisting of hydrogen atoms, alkyl radicals containing from 1 to 5 carbon atoms and radicals having the formula OR²;
ii. Each R² is the same or different and each is selected from the group consisting of alkyl radicals containing from 1 to 4 carbon atoms and radicals having the formula $+R^6O+_nR^5$ wherein each R⁶ is the same or different and each is an alkylene radical containing from 2 to 4 carbon atoms, each R⁵ is the same or different and each is an alkyl radical containing from 1 to 4 carbon atoms and n is an integer of from 1 to 20; and
iii. R³ is selected from the group consisting of alkylene radicals having the formula $+O-R^4O+_x$ in which each R⁴ is the same or different and each is an alkylene radical containing from 2 to 8 carbon atoms and X is an integer of from 1 to 6; provided that R¹ is the same as OR² when R³ is an alkylene radical containing from 1 to 12 carbon atoms; and a minor amount of a corrosion inhibiting hydraulic fluid additive provided that at least one R², in the case of formula A, or at least three R² in the case of formula B be the radical $+R^6O+_nR^5$ as defined above.

13. The hydraulic pressure transmitting fluid of claim 12 the synthetic orthoester component comprises tris (methyl triglycol) orthopropionate.

* * * * *

UNITED STATES PATENT AND TRADEMARK OFFICE
CERTIFICATE OF CORRECTION

PATENT NO. : 3,903,006
DATED : September 2, 1975
INVENTOR(S) : John Scotchford Elliott; Monty Frederick Crook; Geral John Joseph Jayne It is certified that error appears in the above-identified patent and that said Letters Patent are hereby corrected as shown below:

Col. 1, beneath Related U.S. Application Data insert
---Foreign Application Priority Data: December 16, 1969
British Provisional Specification No. 61301/69---

Signed and Sealed this fourth Day of November 1975

[SEAL]

Attest:

RUTH C. MASON
*Attesting Officer*

C. MARSHALL DANN
*Commissioner of Patents and Trademarks*